Nov. 6, 1951 P. F. LINDEMAN ET AL 2,573,721
CAN WIPING AND SHIELDING MECHANISM
Filed Nov. 8, 1949 2 SHEETS—SHEET 1
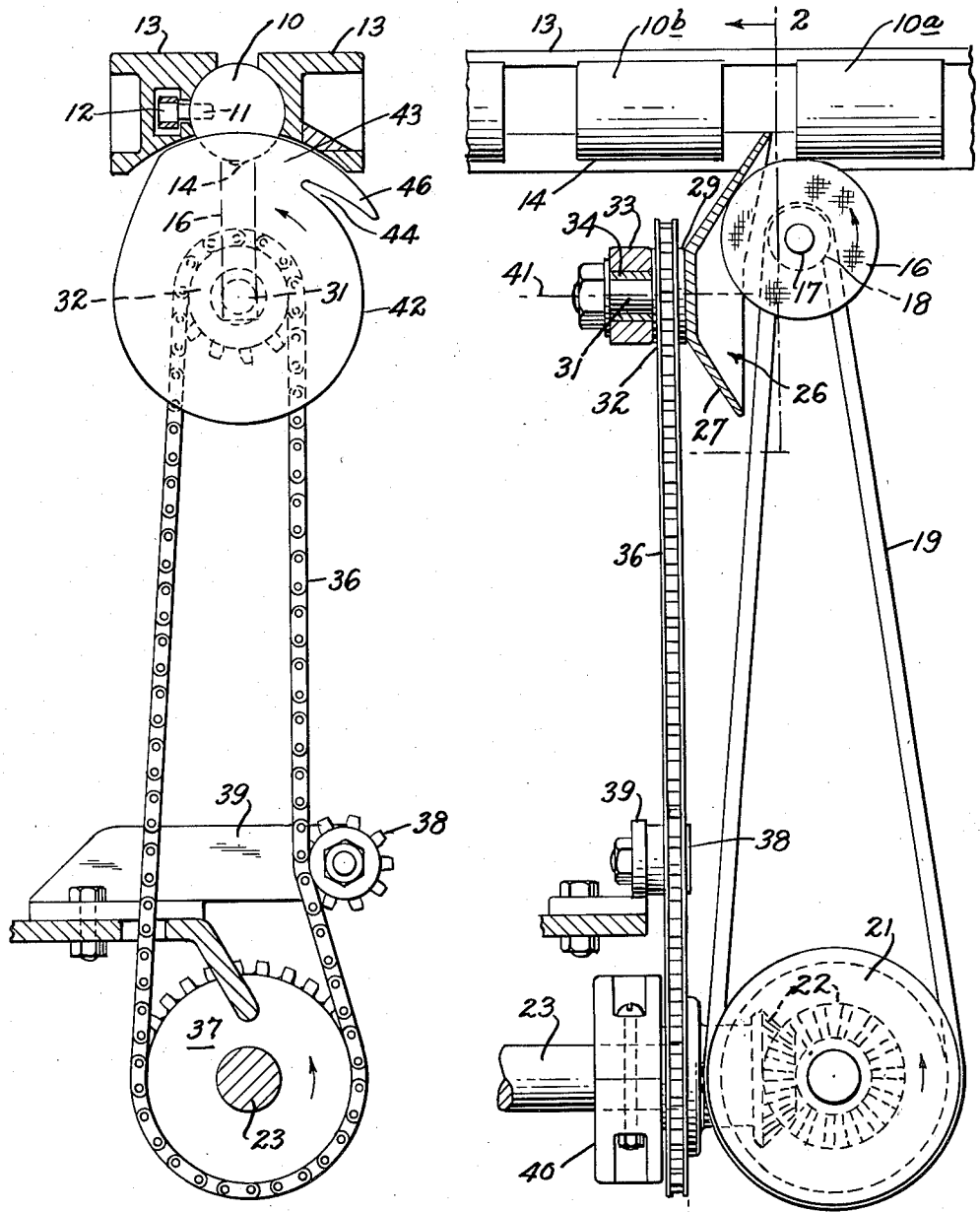
INVENTORS
PHILIP F. LINDEMAN
VERNON J. SIMMEN
BY
ATTORNEY.

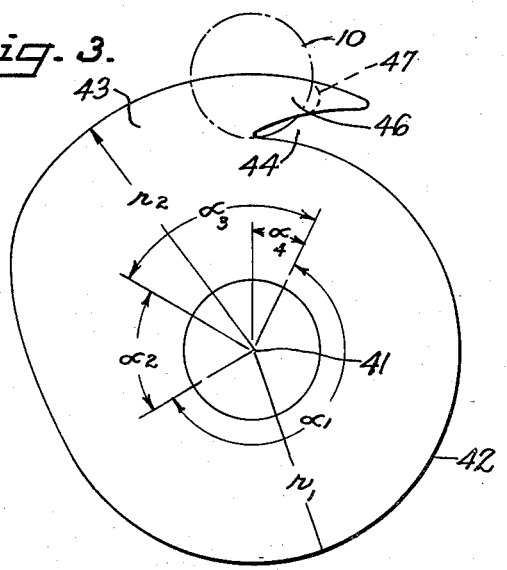
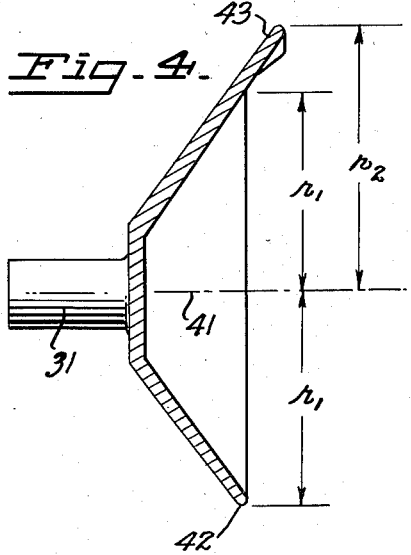
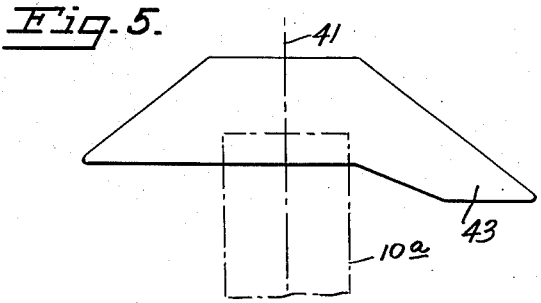
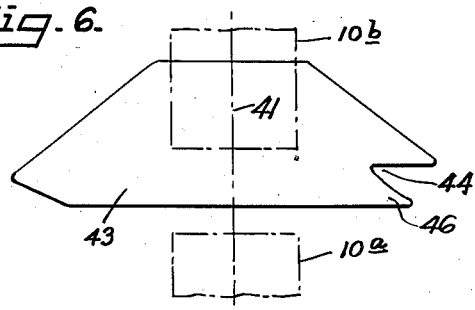
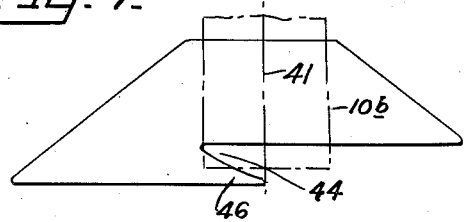
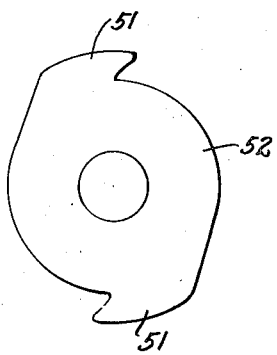
INVENTORS
PHILIP F. LINDEMAN
VERNON J. SIMMEN

Patented Nov. 6, 1951

2,573,721

UNITED STATES PATENT OFFICE

2,573,721

CAN WIPING AND SHIELDING MECHANISM

Philip F. Lindeman, Berkeley, and Vernon J. Simmen, San Francisco, Calif., assignors to Pacific Can Company, San Francisco, Calif., a corporation of Nevada Application November 8, 1949, Serial No. 126,196

4 Claims. (Cl. 113—97)

This invention relates to new and useful improvements in can wiping and shielding mechanism and has particular reference to rotary baffles or shields used on can body makers in conjunction with wipers which remove excess solder from the side seams of cans.

It is common practice in the art of can bodymaking, after the formation of the side seams of cans, to apply solder to the exterior of the side seam and then to wipe off the excess solder by means of a rotating wiper wheel which removes the solder as the side seams of the cans pass over the periphery of the wheel. Such wiper wheels may be made of a plurality of superposed discs of fabric, of brushes, or of various other materials.

One of the problems encountered in the use of such wipers is the throwing of solder inside the can following the particular can being wiped by reason of the fact that solder removed by the wiper tends to fly off the periphery of the wheel tangentially and the trajectory of the solder may pass inside the open end of the can following that being wiped. The presence of solder inside cans is, of course, deleterious. The present invention is a means of preventing solder from reaching can interiors by the use of a shield which intercepts the same.

Other features of the invention are its simplicity and low cost of construction, the fact that it may be interchanged for cans of various sizes, and the ease with which the timing of the rotation of the baffle may be regulated.

With the above and other objects and advantages in view, the invention consists in the matters hereinafter set forth and more particularly pointed out in the appended claims, reference being had therein to the accompanying drawings, in which:

Fig. 1 is a side elevation of a portion of a bodymaker with the device installed, the same being partially broken away in section;

Fig. 2 is a vertical section taken substantially along the line 2—2 of Fig. 1;

Fig. 3 is a schematic view of a shield;

Fig. 4 is a section taken substantially along the line 4—4 of Fig. 3;

Figs. 5, 6 and 7 are schematic plan views taken in various positions of rotation of the shield; and Fig. 8 is a view of a modification similar to Fig. 3.

As indicated in the accompanying drawings, cans 10, having been formed in a bodymaker and having had their side seams soldered by the application of a surplus of solder, are carried along by means of lugs 11 on conveyor chain 12 between horizontally disposed, opposed, arcuate guideways 13 with the side seams 14 positioned underneath. Successive cans are spaced apart a predetermined, uniform distance, said distance being a function of the height and diameter of the cans and other factors not here necessary to detail. The bottom portions of the guideways are cut away, exposing the bottom portions of the cans, including the side seams 14 thereof. As the cans are moved along the guideways, the side seams are wiped by revolving wiper wheel 16, the seam 14 being approximately tangent to the periphery of the wheel. The wiper wheel 16, as has been stated, may be constructed in various ways and of various materials. In the accompanying drawings it may be considered as formed of a plurality of disc-like layers of fabric fixed to hub 17, which is attached to pulley 18. Pulley 18 is driven by belt 19, which is in turn driven by pulley 21, connected by bevel gears 22 to lower drive shaft 23, which is driven by the power source of the bodymaker machine. The wiper wheel 16 rotates in a vertical plane at a rapid rate about an axis transverse to the direction of movement of cans 10 so that the periphery passing over the seam 14 tends to drive surplus solder rearwardly of the can. It will be understood that the solder adhering about seam 14 is not yet set, and hence the wiping action of the wheel removes the excess. Some of the solder may be carried around by wheel 16 to a scraper (not shown) which removes it, but quite frequently solder tends through centrifugal force to be thrown off the wheel tangentially. As will be seen particularly with reference to Fig. 1, when the wiper reaches the rearward end of leading can 10a, tangential projection of the solder might cause the same to lodge within the open end of following can 10b, were it not for the interposition of baffle 26.

Baffle 26 rotates about a horizontal axis parallel to the direction of movement of the cans and directly beneath the axis of said cans. It includes a concave shield portion 27, which may be interchanged for various sizes of cans, welded to hub 29 which is, in turn, connected to sprocket 32 on shaft 31. Said shaft, which is caused to rotate by sprocket 32, is journalled in bracket 33 rigidly attached to the main bed of the machine with anti-friction bushing 34 interposed between shaft 31 and bracket 33. Washer 35 holds said shaft within said bracket. The sprocket 32 is driven by sprocket 37 attached to drive shaft 23. A take-up sprocket 38 is mounted on adjustable take-up bracket 39 to insure constant tension of chain 36. The shaft 23 customarily is rotated one-half revolution per can, and by proper selection of sprockets, baffle 26 may be rotated one revolution per can. The rotation of shield 27 and the movement of conveyor 12 are in carefully timed relation. Sprocket 37 is provided with a split hub 40 which may be used to adjust the position of shield 27 with respect to rotation of shaft 23 and thus adjust the relative timing of shield 27 and conveyor 12, it being understood that conveyor 12 and shaft 23 may be driven from a common source of power.

Shield 27 is concave, with the open end thereof directed toward wiper wheel 16, the wheel being almost tangent to the interior wall of shield 27 with only a slight clearance between the periphery of wheel 16 and shield 27. The shield is frusto-conical in shape, and the angle between the sides of the shield and a vertical plane is preferably about 37½°. Thus the wiper wheel 16 is partly within the confines of the concavity of the shield 27. Said shield is preferably made of polished stainless steel or other suitable material to which solder will not readily adhere.

The shape of shield 27 is one of the important features of the present invention. It is so constructed that as it revolves in timed relation to the progress of cans 10 along conveyor 12 the elevation of the periphery of the shield above its axis of rotation 41 increases and diminishes. This elevation of the periphery 42 may be expressed in terms of lengths of radii erected normal to the axis of rotation 41 of the baffle, said radii being measured from said axis to said periphery at a point vertically above the axis. Thus as leading can 10a is in a position above baffle 26, the periphery 42 is retracted and has a short radius $r_1$ for the angular distance $a_1$ (see Fig. 3). Expressed in other terms, the elevation of the upper edge of the shield is such that it does not contact the leading can passing above it. As soon as the rearward end of the leading can has passed over the baffle, the radius of the upper portion of the periphery 42 increases during the angular distance $a_2$ until the radius is a maximal $r_2$. The difference between $r_1$ and $r_2$ is about one-third the diameter of the can. The "lobe" 43 portion of the periphery extending upward so as to be interposed in the path of travel of the cans between the leading can 10a and following can 10b thus intercepts solder thrown off by wiper wheel 16 and prevents it from entering the following can. Thus the maximum radius $r_2$ remains constant during the angular travel $a_3$, after which the following can moves over the baffle and hence the radius must diminish to $r_1$.

However, it will be apparent in view of the fact that the shield 27 is in the form of a cone, that the bottom or seam 14 part of the following can 10b first intercepts the conical outline of the shield before the higher portions of the can intersect said conical outline and hence in the angular travel $a_4$ the periphery is notched out so as to utilize the solder-intercepting function of ear 46 while permitting forward movement of the can through notch 44 cut in the shield, said notch being formed with its inner edge having a radius $r_1$ and extending inward through the angular spread $a_4$ and its other edge connecting with the end of the portion of the periphery having radius $r_2$.

Referring now to Figs. 5 to 7, which are top plan views and show shield 27 in various positions of rotation as cans 10 (shown in dot-and-dash) pass thereabove, as the leading can 10a is in position over the baffle the periphery is retracted and does not interfere with the passage of the can. (Fig. 5.) When the leading can 10a passes the baffle (as shown in Fig. 6), the periphery 42 is elevated and hence intercepts solder. As the following can 10b approaches the baffle, the bottom part of the forward edge (i. e. the forward end of seam 14) first contacts the outline of the shield and so the shield is notched out at 44 to permit ear 46 to continue to be interposed in front of the following can during angular travel $a_4$. In this manner the shield protects the can interior from solder for the longest possible period of time.

Ear 46 may be bobbed off as suggested by dotted line 47 in Fig. 3 as the extreme end of ear 46 is not essential inasmuch as its area is insufficient to intercept solder thrown outside a restricted path and its presence requires more careful timing of the moving parts to avoid interference with cams.

It will be understood that as a modification illustrated in Fig. 8, two lobes 51 may be employed. The shield 52 is then caused to rotate at one-half revolution per can.

The shield 27 or 52 may be considered a change part for the machine depending upon the height and diameter of cans 10 being formed. Thus the length of angular distance $a_3$ is increased for shorter cans and reduced for taller cans, and likewise for various can diameters.

It will be understood that whereas a preferred embodiment of the invention has been described and illustrated, changes may be made therein without departing from the spirit of the invention and scope of the appended claims.

What is claimed is:

1. In combination, guideways confining the path of movement of open-ended cans in a straight line, a conveyor for moving said cans in a direction parallel to their axes in uniformly spaced relation along said guideways, a wiper positioned to remove surplus solder from said cans while moving along said guideways, a concave, rotatably-mounted shield having a frusto-conical exterior and having its axis of rotation parallel to the direction of movement of said cans positioned between said wiper and the source of said cans, and means for rotating said shield in timed relation to movement of said conveyor, said shield having a peripheral lobe, said lobe being shaped and the relative timing of said conveyor and said rotating wiper being such that the maximum elevation of the periphery of said lobe increases and diminishes during the cycle of rotation of said shield and during the maximum elevation of said lobe said lobe is interposed in the space between a leading and a following can to shield said following can from solder splash from said wiper, said lobe being notched in its trailing edge to form an ear, said notch having one edge with its radial distance from said axis of rotation of said shield no greater than the elevation of the lowermost portions of said cans moving along said guideways above said axis of rotation, said notch having another edge of increasingly greater distance from said axis of rotation, the juncture of said last-named two edges being located spaced inwardly from said trailing edge of said lobe so that when said juncture is uppermost the foremost and lowermost portion of said following can projects through said notch and as said shield revolves an increasing portion of said following can projects through said notch and said ear shields the remainder of the interior of said following can from solder splash.

2. The combination defined in claim 1 in which said wiper is positioned at least partially within the concavity of said shield and in close proximity thereto.

3. The combination defined in claim 1 which further includes means to adjust the timing of said shield with respect to movement of said conveyor, and detachable means to retain said shield in position and permit replacement of said shield to accommodate cans of different heights.

4. In combination, guideways confining the path of movement of open-ended cans in a straight line, a conveyor for moving said cans in a direction parallel to their axes in uniformly spaced relation along said guideways, a wiper positioned to remove surplus solder from said cans while moving along said guideways, a concave, rotatably-mounted shield having a frusto-conical exterior and having its axis of rotation parallel to the direction of movement of said cans positioned between said wiper and the source of said cans, means for rotating said shield in timed relation to movement of said conveyor, said shield having a peripheral lobe, said lobe having a maximum radial distance from said axis of rotation greater than the radial distance of the remainder of the periphery of said shield, said lobe having an arcuate length and angular position such that said lobe may be interposed in the space between a leading and a following can to shield said following can from solder splash from said wiper, and an ear on the trailing edge of said lobe formed by a notch extending inwardly and in a direction opposite the direction of rotation from the trailing end of said lobe, the innermost point of said notch having a radial distance above said axis of rotation no greater than the distance of said cans above said axis and said innermost point being angularly related to the rotation of said shield and movement of said cans so that the foremost and lowermost portion of said following can projects through said notch and as said shield revolves an increasing portion of said following can projects through a widening portion of said notch and said ear shields the remainder of the interior of said following can from solder splash.

PHILIP F. LINDEMAN.
VERNON J. SIMMEN.

REFERENCES CITED

The following references are of record in the file of this patent:

UNITED STATES PATENTS

| Number | Name | Date |
|---|---|---|
| 2,433,068 | Sedwick | Dec. 23, 1947 |